United States Patent
Ruby

(10) Patent No.: US 9,228,882 B2
(45) Date of Patent: Jan. 5, 2016

(54) VEHICLE SEAT OCCUPANT DETECTION DEVICE WITH AN ADJUSTABLE THRESHOLD

(71) Applicant: DELPHI TECHNOLOGIES, INC., Troy, MI (US)

(72) Inventor: Scott L. Ruby, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 184 days.

(21) Appl. No.: 14/109,353

(22) Filed: Dec. 17, 2013

(65) Prior Publication Data
US 2015/0168206 A1    Jun. 18, 2015

(51) Int. Cl.
| | |
|---|---|
| *B60K 28/04* | (2006.01) |
| *G01G 19/12* | (2006.01) |
| *B60R 21/015* | (2006.01) |
| *G01G 19/414* | (2006.01) |
| *B60N 2/00* | (2006.01) |

(52) U.S. Cl.
CPC ............. *G01G 19/12* (2013.01); *B60K 28/04* (2013.01); *G01G 19/4142* (2013.01); *B60N 2/002* (2013.01); *B60R 21/01516* (2014.10)

(58) Field of Classification Search
CPC .. B60K 28/04; B60N 2/002; B60R 21/01516; G01G 7/02; G01G 19/4142; G01G 19/12
IPC ........................................................ B60K 28/24
See application file for complete search history.

(56) References Cited

U.S. PATENT DOCUMENTS

| | | | |
|---|---|---|---|
| 3,757,067 A | 9/1973 | Eberle et al. | |
| 3,772,644 A | 11/1973 | Hanselmann et al. | |
| 4,361,741 A | 11/1982 | Leskoverc et al. | |
| 4,678,058 A * | 7/1987 | Wooters | 180/273 |
| 5,864,295 A * | 1/1999 | Jarocha | 340/667 |
| 7,686,119 B2 * | 3/2010 | Greene | 180/268 |

OTHER PUBLICATIONS

European Search Report dated May 19, 2015.

* cited by examiner

*Primary Examiner* — Randy W Gibson
(74) *Attorney, Agent, or Firm* — Lawrence D. Hazelton

(57) ABSTRACT

A vehicle seat occupant detection device with an adjustable threshold is provided. The device includes a sensor, a spring, and an adjuster. The sensor is configured to indicate a first state when a seat is not occupied and a second state when the seat is occupied. The spring is configured to urge the sensor toward the first state. The adjuster is coupled to the spring. The adjuster is operable to vary a force threshold that the device transitions from the first state to the second state.

4 Claims, 2 Drawing Sheets

VEHICLE SEAT OCCUPANT DETECTION DEVICE WITH AN ADJUSTABLE THRESHOLD

TECHNICAL FIELD OF INVENTION

This disclosure generally relates to a vehicle seat occupant detection device, and more particularly relates to a device with an adjustable threshold.

BACKGROUND OF INVENTION

Vehicle seat occupant detectors such as those used in seat belt reminder systems may include one or more springs as part of a weight or force detection device. Such a device is often installed under a cushion of a seat assembly. Unfortunately, the variety of seat designs used in various vehicles may lead to undesirable part number proliferation. That is, many different final assemblies of the device may be necessary to meet various customer requirements, but the only difference from one assembly to the next is the spring rate of springs used in the device which determines the amount of weight or force necessary for the device to determine that a seat is occupied.

It has also been observed that the weight or force threshold at which an occupant detection device indicates that a seat is occupied may change over time due to, for example, breakdown/wear of the cushion and/or seat-cover. As such, it would be advantageous if a vehicle seat occupant detection device could be adjusted as part of a vehicle service process.

SUMMARY OF THE INVENTION

In accordance with one embodiment, a vehicle seat occupant detection device with an adjustable threshold is provided. The device includes a sensor, a spring, and an adjuster. The sensor is configured to indicate a first state when a seat is not occupied and a second state when the seat is occupied. The spring is configured to urge the sensor toward the first state. The adjuster is coupled to the spring. The adjuster is operable to vary a force threshold that the device transitions from the first state to the second state.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1A:
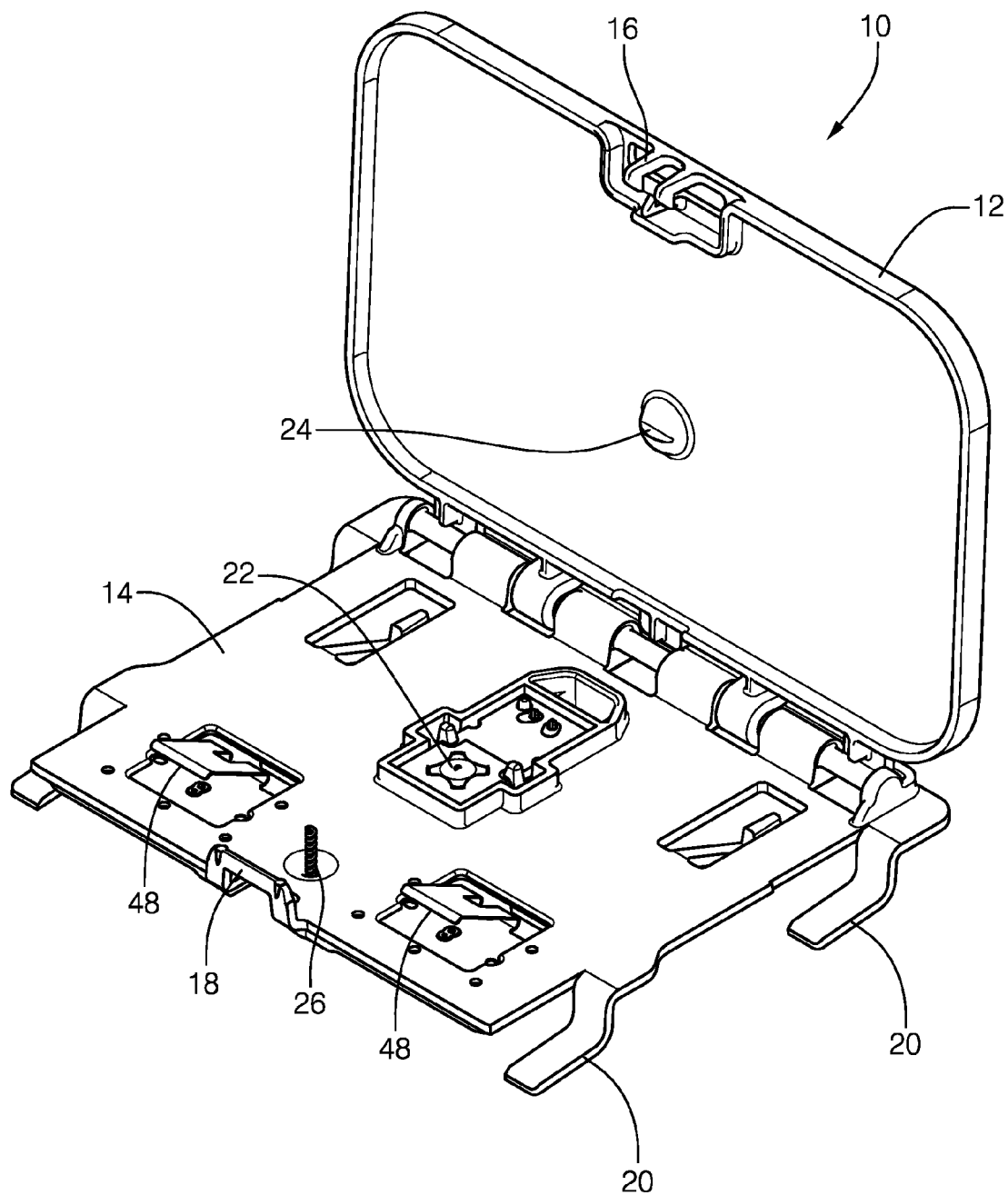
FIG. 1A is a top perspective view of a vehicle seat occupant detection device in accordance with one embodiment.
Figure 1B:
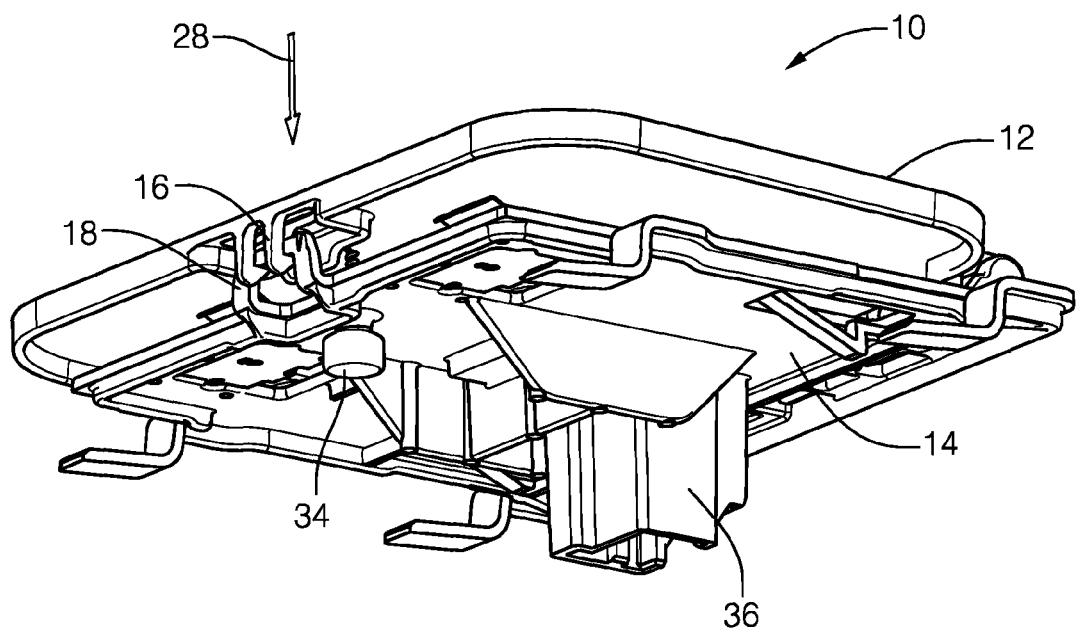
FIG. 1B is a bottom perspective view of a vehicle seat occupant detection device in accordance with one embodiment.

FIGS. 1A and 1B illustrate a non-limiting example of a vehicle seat occupant detection device, hereafter referred to as the device 10. FIG. 1A generally illustrates a top view the device 10 prior to closing a cover 12 onto a base 14. FIG. 1B generally illustrates a bottom view of the device 10 after the cover 12 has been closed sufficiently for a latch 16 to engage with a loop 18 to keep the cover 12 close to the base 14. The base 14 may include a tab 20 configured to cooperate with a spring frame (not shown) of a vehicle seat (not shown) to hold the device 10 in place underneath a foam cushion portion of the vehicle seat. By way of example and not limitation, the device 10 may be part of a seat belt reminder system or an air-bag deployment system in a vehicle.

The device 10 generally includes a sensor 22 configured to indicate a first state when a vehicle seat in which the device 10 is installed is not occupied, and a second state when the seat is occupied. In one embodiment, the sensor may include, or essentially be, a switch operable to an open state and a closed state. By way of example and not limitation, the switch may be a snap-dome type switch that cooperates with a protrusion 24 on the cover 12. Protrusion 24 is generally configured to extend into the sensor 22 to operate the switch from, for example, an open-state when the seat is not occupied, to a closed state when the seat is occupied by a person characterized as being heavier than some predetermined weight or force threshold, fifty kilograms (50 kg) for example. As will be explained in more detail below, the force threshold may be generally determined by the strength or spring rate of one or more springs that are part of the device 10. As used herein, the force threshold of the device 10 generally refers to the minimum force weight or force applied to the device 10 that caused the device to change from the first state to the second state. That is, if a force 28 is less than the force threshold, then a first state will be indicated, and if the force 28 is greater than the force threshold, then the second a second state will be indicated by the device 10, or more specifically by the sensor 22.

Alternatively, the sensor 22 may include a linear detector configured to output a variable signal that corresponds to the relative positions of the cover to the base indicative of a weight of an occupant residing on the seat. For example, the sensor may include a capacitance detector configured to detect a variable capacitance between the sensor and a metal plate (not shown) attached to the cover about where the protrusion 24 is shown. By way of another example, the protrusion 24 may be replaced by an iron rod attached to the cover and positioned to protrude into an inductive detector that is part of the sensor 22. The sensor may include additional electronics that measure a linear signal from the linear detector, and determine if the first state or the second state should be indicated based on the value of the linear signal, as will be recognized by those in the art. The base 14 may define a connector 36 so signals from the sensor 22 can be electrically coupled to a vehicle wiring harness. Alternatively, the sensor 22 may include a wireless transmitter or transceiver (not shown) so the sensor 22 can communicate with the vehicle's electrical system wirelessly.

As suggested above, the device generally includes a spring 26 configured to urge the sensor 22 to or toward the first state. That is, the spring 26 is generally configured to urge the cover 12 and the base 14 apart in opposition to a force 28 arising from the presence of an occupant on the seat. By way of example and not limitation, the spring 26 may be a coil type spring that includes a coil portion 30 where the coils of the spring 26 are relative spaced apart so the spring 26 is compressible. The spring 26 may also include an end 32 of the spring 26 where the coils of the spring are relatively tight or in contact so the spring 26 readily installed into the device 10.

In order to provide for a device 10 that can be readily adjusted to be responsive to different occupant weight thresholds or force thresholds, or be readily adapted to different seat designs, or be readily serviced if the seat is becoming worn out whereby the force threshold has shifted; the device 10 includes an adjuster 34 coupled to the spring 26. In general, the adjuster 34 is operable to vary a force threshold that the device 10 transitions from the first state to the second state. In other words, the amount of force 28 necessary to move the cover 12 toward the base 14 sufficiently for the sensor 22 to be operated from the first state to the second state can be varied by adjusting the adjuster 34.

Figure 2:
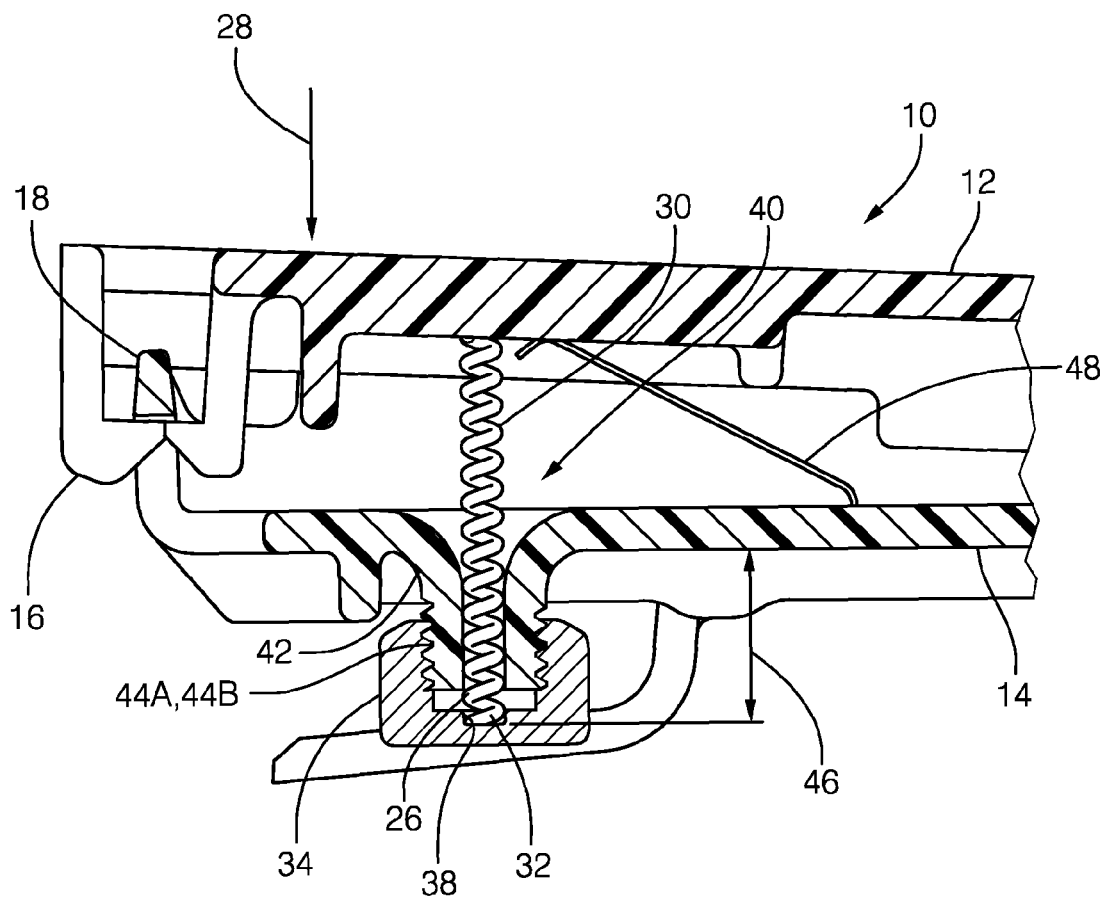
FIG. 2 is sectional side view of the device of FIGS. 1A and 1B in accordance with one embodiment.

FIG. 2 illustrates non-limiting details of one configuration of the adjuster 34. In this non-limiting example, the base 14 defines an opening 40 through which the spring 26 passes. The adjuster may include a cup 38 configured to receive the end 32 of the spring 26, and preferably retain the spring 26 by way of, for example, an interference fit. The base 14 further defines a flange portion 42 that includes threads 44A on the exterior of the flange portion 42. The adjuster 34 also defines threads 44B that cooperate with the threads 44A of the flange portion 42. By turning or rotating the adjuster 34 relative to the base 14, the various features cooperate to vary the effective depth 46 of the cup 38 and thereby vary the force threshold of the device 10. In other words, the adjuster 34 can be moved relative to the cover 12 so the distance that the spring 26 spans is varied. As such, a pre-load force of the spring 26 directed to hold the cover 12 away from the base 14 can be adjusted or varied so the force 28 necessary to operate the sensor 22 from the first state to the second state can be adjusted or varied.

The device 10 may also include one or more secondary springs 48 that may not be adjustable, but are configured to cooperate with the spring 26 (i.e. the adjustable spring) to determine the force threshold. The secondary springs 48 may also advantageously compensate for instance where the force 28 is not applied uniformly or centrally to the device 10 because, for example, the occupant is sitting sideways or off-center. The secondary springs 48 may also provide for the arrangement of the spring 26 and adjuster 34 to have a smaller change in threshold force per revolution of the adjuster 34 so that the force threshold could be more finely tuned than would be the case if the device did not have the secondary springs 48.

It is recognized that other spring/adjuster configurations could be used to provide for an adjustable threshold, and that the secondary springs could also include some feature to provide for adjustment such as a wedge (not show) inserted within the secondary springs 48 illustrated to increase the effective spring rate of the secondary springs 48. It is also recognize that a locking mechanism may be included to lock the adjuster in place so, for example, vibration does not cause the position of the adjuster 34 relative to the base 14 to creep over time.

Accordingly, a vehicle seat occupant detection device (the device 10) is provided. By providing for an adjustable spring (combination of the spring 26 and the adjuster 34), the preload of the spring 26 can be varied so that the force threshold of the device can be varied. As such, the same version of the device 10 can be readily adapted to similar seats with different occupant weight threshold requirements, or different seat designs that cause a different value of the force 28 to be applied to the device 10 by the same weight occupant. Furthermore, if the seat becomes worn such that the same weight occupant applies a different value of the force 28 to the device 10 when compared to when the seat was new, the force threshold can be readily adjusted by a service technician as opposed to replacing the device 10 or replacing the various springs used in the device 10.

While this invention has been described in terms of the preferred embodiments thereof, it is not intended to be so limited, but rather only to the extent set forth in the claims that follow.

I claim:

1. A vehicle seat occupant detection device with an adjustable threshold, said device comprising:
    a sensor configured to indicate a first state when a seat is not occupied and a second state when the seat is occupied;
    a spring configured to urge the sensor toward the first state, wherein the spring comprises a coil portion; and
    an adjuster coupled to the spring, wherein the adjuster is operable to vary a force threshold that the device transitions from the first state to the second state, wherein the adjuster defines a cup configured to receive an end of the spring, and a threaded portion configured to vary the effective depth of the cup and thereby vary the force threshold.

2. The device in accordance with claim 1, wherein the device is part of a seat belt reminder system in a vehicle.

3. The device in accordance with claim 1, wherein the sensor comprises a switch operable to an open state and a closed state.

4. The device in accordance with claim 1, wherein the sensor comprises a linear detector configured to output a variable signal indicative of a weight of an occupant residing on the seat.

* * * * *